3,050,467
ANTISEPTIC CLEANER

Carl Horowitz, Brooklyn, and Meyer Mendelsohn, New York, N.Y., assignors, by mesne assignments, to Yardney International Corp., New York, N.Y., a corporation of New York
No Drawing. Filed Nov. 8, 1957, Ser. No. 695,192
3 Claims. (Cl. 252—107)

Our present invention relates to antiseptic soaps and has for its principal object the provision of surface-active cleansing agents of the usual type, i.e. soaps, detergents or mixtures thereof, incorporating an effective, safe and bland antimicrobial agent.

We have found, in accordance with this invention, that a product of the desired character can be obtained by incorporating in a commercial cleansing composition of either the liquid or the solid type an antiseptic agent consisting essentially of a water-soluble silver salt of partially depolymerized alginic acid. This silver salt, being water-soluble, may be incorporated in liquid cleansing compositions by solution or in solid cleansers (e.g. of bar, chip or flake type) by dispersion. If desired, decolorizing agents may be added to the cleansers to relieve the darkening of the products due to admixture of the silver salt.

The silver salt of partially depolymerized alginic acid is not claimed here per se since it is the subject of copending application Ser. No. 477,432 filed December 23, 1954, now abandoned. Similarly, the use of decolorizing compounds in conjunction with such silver salt is separately claimed in co-pending application Ser. No. 392,518 filed November 16, 1953, now abandoned by one of the present applicants. The instant application is a continuation-in-part of our application Ser. No. 392,519, filed November 16, 1953, which is concurrently abandoned. We have determined that the antimicrobial activity of the products according to the invention is considerably greater than the expected sum total of the antiseptic actions of the silver alginate and the various cleansers alone, presumably as the result of some synergistic effect.

The silver salt mentioned above is prepared as follows:

Example 1

Alginic acid, in the form of a white powder, is partially depolymerized by heating for six days at 80° C. in a constant-temperature oven. Ten grams of the resulting, slightly yellowish powder is suspended in 200 cc. of distilled, sterile water. A sample of this suspension neutralized with KOH will have a viscosity of 1.25 to 1.75 centipoises. Twenty grams of silver carbonate $Ag_2CO_3$ is added to the suspension under constant stirring for half an hour. After the evolution of $CO_2$ has subsided, the mixture is heated to 40° C. with the addition of 10 cc. of 10% KOH to adjust its pH. The mixture is maintained at this temperature, with continued stirring, for two hours and is thereafter left standing overnight. On the following day, the clear, dark-brown solution is filtered from the sediment. The final solution has a pH of 8 and a silver content of 1.48% by weight.

Example 2

A solution of 5% of alginic acid in water is partially depolymerized by refluxing and neutralizing until, after approximately one week's treament, the neutral solution has a viscosity in the range of 1.25 to 1.75 centipoises. To this solution is added 4% by weight of AgO. The mixture is refluxed for one hour more and then filtered. The filtrate is collected as a dark brown liquid and contains approximately 1.5% silver by weight.

For purposes of convenience the silver content of the solution of Examples 1 and 2 may be adjusted to 1%, by weight, by the addition of neutralized solution of partially depolymerized alginic acid as used for the viscosity determinations.

It may additionally be mentioned that the silver carbonate and the silver oxide used in the two examples are interchangeable.

The silver salt of the partially depolymerized alginic acid described in Examples 1 and 2 is alcohol-insoluble and may, if desired, be recovered from the solution by the addition of alcohol. The resultant material has a silver content between 15% and 25% by weight, the ratio of chemically bond silver to reaction product being determinable (allowing for the presence of unreacted organic material and inorganic silver compounds and/or free silver in the solution) at approximately 18%.

The dark color of the liquid of Examples 1 and 2, if objectionable, may be considerably lightened by adding to the solution between ¼% and 1%, by weight, of an oxidant. Suitable oxidants include permanganates, perborates, perchlorates etc. of sodium, potassium and so forth.

Antiseptic cleansers according to this invention may be prepared as follows:

Example 3

A liquid soap is prepared from the following ingredients:

350 g. of castor oil
350 g. of olive oil
100 g. of oleic acid
200 g. of distilled water The mixture of these materials to heated to 70° C. and maintained at this temperature for three hours. During this period there is added to it, at 10-minute intervals, some potassium hydroxide of alternately 50% and 20% concentration, the mixture being constantly stirred throughout. The quantities of alkali thus admixed add up to the following totals:

|  | G. |
|---|---|
| 50% KOH | 150 |
| 20% KOH | 300 |

Next, the resulting soap is allowed to cool, whereupon 4000 cc. of distilled water is added and the pH of the mixture is adjusted to 8 by the addition of 20 cc. of oleic acid. Then we add 40 g. of the antiseptic liquid solution of Example 1 or 2. The solution is now left standing for two days (aging). The final product is liquid soap of distinctly antiseptic character, as determined by the Cade modification of the serial-dilution washing technique.

Example 4

A solid soap is prepared from the following ingredients:

50 g. of olive oil
50 g. of castor oil
100 g. of oleic acid

The mixture of these materials is heated to 70° C. Then 60 cc. of 45% sodium hydroxide NaOH is stirred into it in small increments, at 10-minute intervals. After three hours we add 1% by weight of the solution of Example 1 or 2. After aging the mass is pressed, milled and then cut into cakes. The solid soap is as effective as an antiseptic as the liquid soap described above when tested as cited in Example 3.

Example 5

A commercial laundry detergent powder consisting of salts of long-chain alcohols, reinforced with foam builders of the "coconut-oil acid" ester type, is moistened with 1% by weight of the liquid from Example 1 or 2. The powder is then dried by blowing with warm dried air. The resulting cleansing powder, when tested by the aforestated procedure against the commercial product from which it was made, exhibits a distinct increase in antibacterial activity.

*Example 6*

A commercial scouring powder containing a soap-detergent mixture in combination with abrasives and bleaches, in addition to other surface-active and complexing agents, is moistened with 1% by weight of the liquid of Example 1 or 2. The resultant mass is then air-dried. When surfaces subjected to controlled contamination were washed with the product of this example and then cultured for bacterial count, the count was materially lower than the count yielded by controls washed with the unmixed commercial scouring powder.

The silver content of the products according to the invention, as will be apparent from the foregoing examples, ranges generally between 0.01% and 1%, by weight, of the resultant mixture, this corresponding to a content of about 1% to 10%, by weight, of silver alginate.

We claim:

1. An antimicrobial cleansing composition consisting essentially of a mixture of: (A) from about 90% to about 99%, by weight, of a water-soluble soap, and (B) from about 10% to about 1%, by weight, of a silver salt of partially depolymerized alginic acid, the viscosity of said acid when neutralized and prior to conversion into its silver salt ranging substantially between 1.25 and 1.75 centipoises in concentrations of 5% in aqueous solution.

2. An antimicrobial cleansing composition consisting essentially of a mixture of: (A) from about 90% to about 99%, by weight, of water-soluble alkal metal salts of higher fatty acids and (B) from about 10% to about 1%, by weight, of a silver salt of partially depolymerized alginic acid, the viscosity of said acid when neutralized and prior to conversion into its silver salt raging substantially between 1.25 and 1.75 centipoises in concentrations of 5% in aqueous solution.

3. An antimicrobial cleansing composition consisting essentially of a mixture of from about 90% to 99% by weight of a water-soluble soap, from about 10% to 1% by weight of a silver salt of partially depolymerized alginic acid and an oxidant, the viscosity of said acid when neutralized and prior to conversion into its silver salt ranging substantially between 1.25 and 1.75 centipoises, said oxidant being present in quantities up to 1% by weight.

References Cited in the file of this patent

UNITED STATES PATENTS

| | | |
|---|---|---|
| 1,993,686 | Schulenburg | Mar. 5, 1935 |
| 2,155,361 | Myers | Apr. 18, 1939 |
| 2,547,261 | Geiger et al. | Apr. 3, 1951 |
| 2,612,498 | Alburn | Sept. 30, 1952 |

FOREIGN PATENTS

| | | |
|---|---|---|
| 407,039 | Great Britain | Mar. 2, 1934 |

OTHER REFERENCES

"Jour. of Soc. Chem. Ind.," Stanford, Apr. 29, 1886, pp. 218–221.